United States Patent

[11] 3,581,936

| [72] | Inventor | Hendrikus Gerhardus Muller<br>Hengelo (O), Netherlands |
|---|---|---|
| [21] | Appl. No | 807,224 |
| [22] | Filed | Mar. 14, 1969 |
| [45] | Patented | June 1, 1971 |
| [73] | Assignee | N. V. Machinefabriek B & S Bedrijven v.d.<br>Woerdt<br>Hengelo, Netherlands |
| [32] | Priority | Mar. 14, 1968 |
| [33] | | Netherlands |
| [31] | | 6803633 |

[54] APPARATUS FOR ISOLATING ARTICLES FROM A SUPPLY
17 Claims, 3 Drawing Figs.

[52] U.S. Cl.................................................. 221/64,
221/190, 221/204, 221/254
[51] Int. Cl....................................................... B65d 83/00
[50] Field of Search.......................................... 221/64,
200, 204, 190, 192, 254, 272, 1, 209, 312;
214/17.8

[56] References Cited
UNITED STATES PATENTS

| 1,726,139 | 8/1929 | Blasco et al | 214/17.8UX |
| 3,052,354 | 9/1962 | Luketa | 214/17.8X |
| 3,087,602 | 4/1963 | Hinkle, Jr. | 198/1X |
| 3,343,655 | 9/1967 | Howard | 198/218 |
| 3,442,405 | 5/1969 | Schaeffer | 214/44X |

*Primary Examiner*—Stanley H. Tollberg
*Assistant Examiner*—David A. Scherbel
*Attorney*—Young & Thompson ABSTRACT: Articles such as shrimps are isolated from a supply contained in a hopper whose bottom is a flexible multiperforate sheet. A member raises the central area of the sheet so that only one or a few articles remain on the raised portion and the others fall away to the sides. An article transfer mechanism operates in synchronism with the raising mechanism to receive and remove the raised articles.

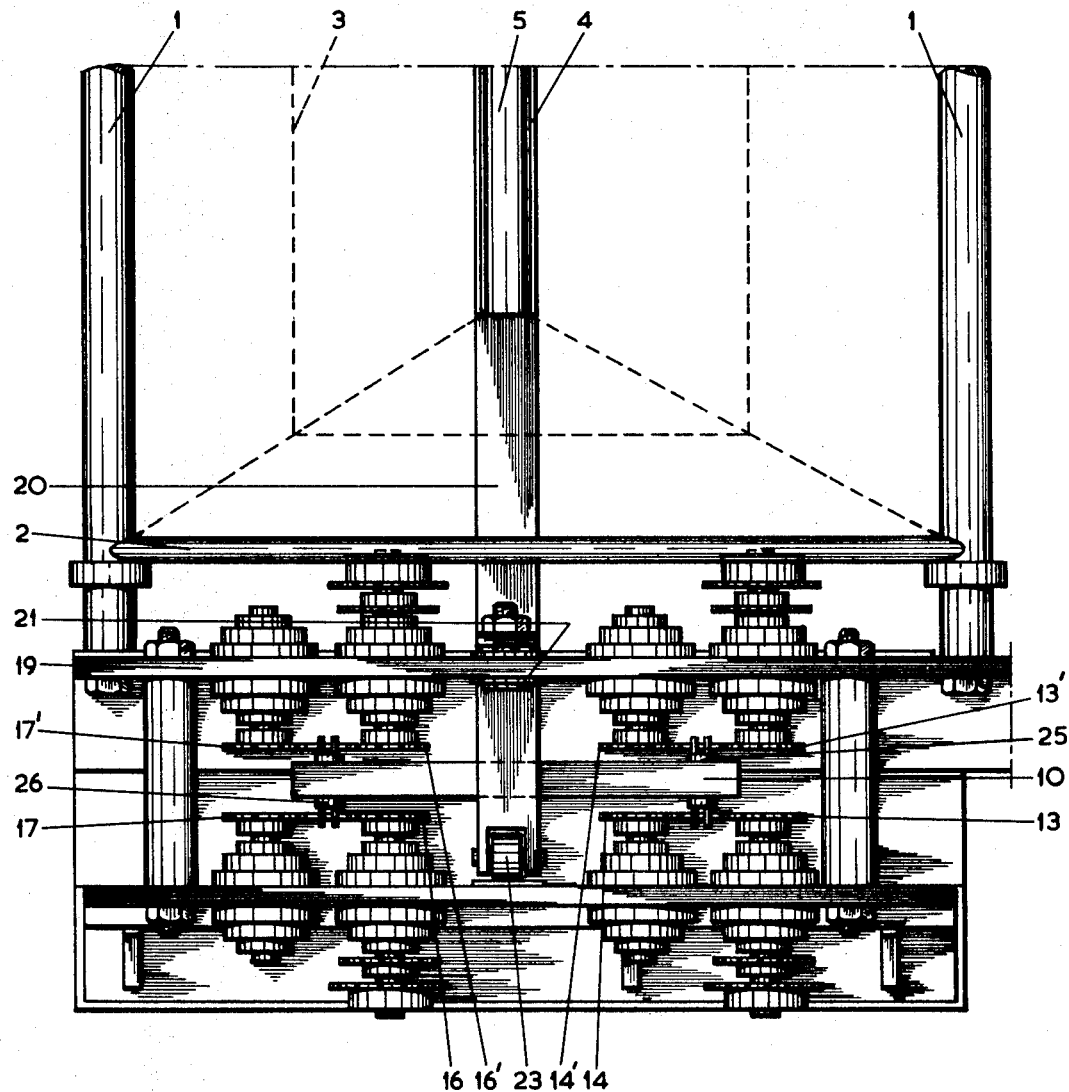

APPARATUS FOR ISOLATING ARTICLES FROM A SUPPLY

The present invention relates to apparatus for isolating articles from a supply, more particularly of the type in which one or several articles are isolated from a supply and presented to and removed by a synchronized article transfer apparatus.

The apparatus is useful in connection with the isolation of one or several small articles from a randomly oriented mass of articles of generally similar configuration. It is particularly useful, however, in connection with shrimps and will be described and illustrated in connection with shrimps.

It is an object of the present invention to provide apparatus for isolating articles from a supply, by which one or several articles may be rapidly and easily isolated from a randomly oriented mass of articles.

Another object of the present invention is the provision of apparatus for insulating shrimps from a supply, which will have little if any tendency to damage the shrimps.

Still another object of the present invention is the provision of apparatus for isolating shrimps from a supply, which aids in separating smaller particles and water and other foreign material from the shrimps.

Yet another object of the present invention is the provision of apparatus for isolating shrimps from a randomly oriented mass, which also aids in preventing the remaining shrimps in the supply from becoming stuck to each other.

Finally, it is an object of the present invention to provide apparatus for isolating articles from a supply, which will be relatively simple and inexpensive to manufacture, easy to install, operate, maintain and repair, and rugged and durable in use.

Other objects and advantages of the present invention will become apparent from a consideration of the following description, taken in connection with the accompanying drawings, in which:

FIG. 3 is a top plane view of the structure shown in FIG. 2.

Figure 1:
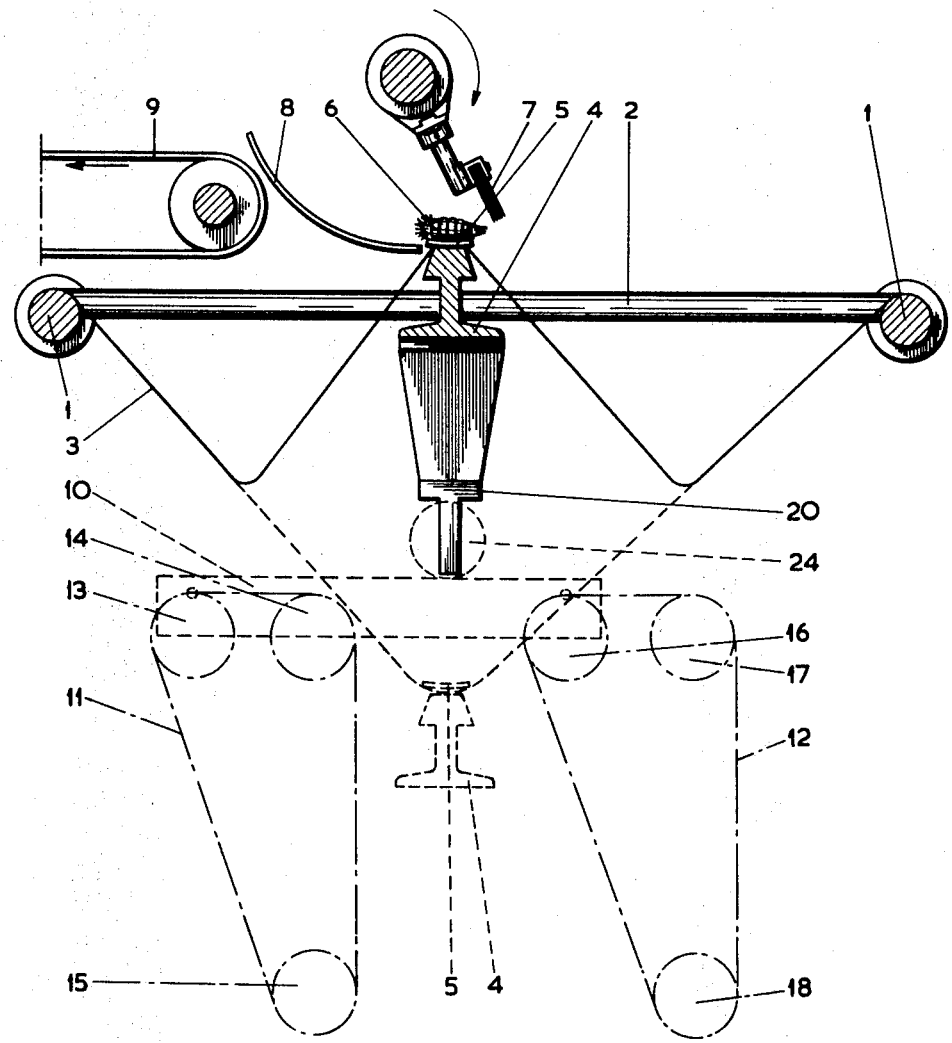
FIG. 1 is a somewhat schematic side elevational cross-sectional view of apparatus according to the present invention, showing in full line the parts in the position they occupy when one or several articles have been isolated from the supply, and in phantom line the parts in the position they occupy when further articles have been received in preparation for their isolation.

Referring now to the drawings in greater detail, there is shown a hopper for the reception and retention of a mass of shrimps, the hopper's upper edge being defined by a fixed horizontal frame comprised of side frame members 1 and end frame members 2 which are secured at their ends to side frame members 1. A flexible hopper bottom is provided which is in the form of a flexible sheet 3 supported at its edges on frame members 1 and 2. Sheet 3 is preferably multiperforate, and preferably foraminous, for the passage of smaller particles and water therethrough, and most preferably is in the form of a net, although it may also be in the form of a fabric or a multiperforate plastic sheet. Sheet 3 forms a downwardly extending pouch in its natural or undeformed condition.

A member is provided for moving a central portion of sheet 3 upward and downward, in the form of a horizontal beam 4 parallel to frame members 1 and perpendicular to but spaced endwise from frame members 2. Beam 4 on its upper surface carries an elongated plate 5 which is upwardly concave in transverse cross section and which is parallel to and coextensive with the beam 4. Sheet 3 is clamped between beam 4 and plate 5.

Figure 2:
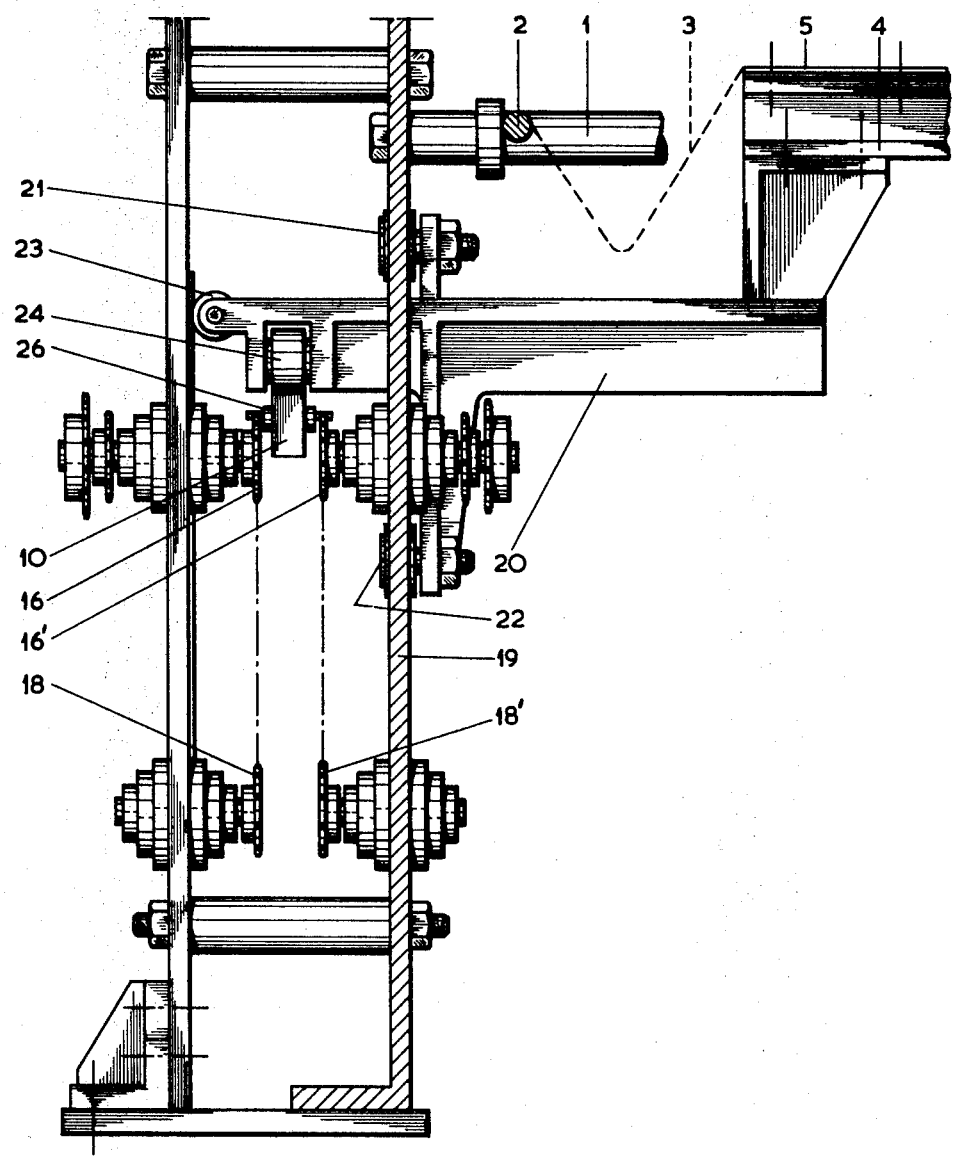
FIG. 2 is a somewhat more detailed elevational fragmentary cross-sectional view, to a larger scale, of one side of the apparatus according to the present invention.

It will be seen that when beam 4 and plate 5 are moved upwardly as a unit to the full line position of FIG. 1, a central portion of sheet 3 is raised and only one or several articles 6 such as shrimps will remain on plate 5, and the remainder will fall or tumble back on both sides and at the ends of plate 5 into the moat or trough provided by sheet 3, as best seen in FIGS. 1 and 2. The number of articles 6 which can thus be carried on plate 5 is of course predetermined by the length and width of plate 5. If desired, the dimensions of plate 5 can be such as to support only a single article, in which case beam 4 will be so short as to be nothing but a pedestal.

An article transfer device in the form of a rotary transfer conveyor is provided above plate 5, as seen in FIG. 1. The rotary transfer device may for example carry a brush 7 thereon for sweeping articles 6 onto guide plate 8 and thence onto the upper run of conveyor 9 whence the articles may be conveyed to feed means or orienting means or any other means for handling or treating the articles in question.

The rotary motion of the rotary transfer device can be coordinated with the vertical movements of plate 5, so that brush 7 sweeps the lowermost point of its path when plate 5 is in the raised position of FIG. 1. This coordination can be effected through well-known drive means which accordingly need not be disclosed in greater detail. Or the synchronized transfer of articles from plate 5 can be effected by means of a rotary transfer device having the form shown in the copending application Ser. No. 806,315, filed Mar. 14, 1969.

Vertical movement of the assembly 4, 5 is effected by means of a horizontal bar 10 at each end of the apparatus, which orbits in a vertical plane perpendicular to beam 4 while remaining horizontal at all times. To this end, each end of bar 10 is fastened to and between a pair of chains 11 and 12 respectively, there being four chains 11 and 12 for each bar 10, disposed in pairs on opposite sides of bar 10 and at each end of bar 10. Chains 11 pass over guide rollers 13, 14 and 15; while chains 12 pass over guide rollers 16, 17 and 18. In FIGS. 2 and 3 of the drawings, the guide rollers on the side of bar 10 which is not visible in FIG. 1 are designated with primed reference numerals. The rollers for each chain are disposed at the corners of a polygon whose upper side is horizontal. The length of this upper side and the speed of the chains determine the swell time of plate 5 at the top of its path, which is the article transfer portion of its path. Preferably, the polygon whose corners are occupied by the rollers is a triangle, and more preferably a right triangle whose right angle is disposed between the ascending run and the horizontal run of each chain.

The rollers are mounted on horizontal axles which in turn are carried by bearings in a frame 19 for the apparatus. At least one axle for each chain will be power driven in rotation by conventional drive means (not shown), thereby to circulate the chains in the indicated direction. As indicated above, this drive is synchronized with the drive of the article transfer device.

Beam 4, whatever its length, is carried by a horizontal bracket 20 which is supported at its opposite ends on the bars 10 which are at opposite ends of the apparatus. To guide bracket 20, the bracket is provided with downwardly extending legs that carry guide rollers 21 and 22 that are vertically aligned and spaced apart a substantial vertical distance and that are disposed in vertical slots (not shown) in frame 19 at opposite ends of bracket 20. Bracket 20 at its opposite ends is also provided with rollers 23 that roll vertically on guide surfaces of frame 19.

Each bar 10 thus circulates and slides beneath and in supporting relation with bracket 20; and to this end, bracket 20 carries rollers 24 at its opposite ends which are rotatable about horizontal axes and each of which rolls on a subjacent bar 10.

It is also to be noted that members 25 and 26 project from opposite sides of opposite ends of bar 10, thereby to provide axles that are journaled in the chains.

In operation, upon the circulation of bars 10, the bracket 20 with its supported beam 4 and plate 5 will reciprocated vertically with dwell periods between the ascent and the descent. When plate 5 is at its lowermost point, shrimps in the sheet 3 will tumble into the declivity of the sheet and cover plate 5. When plate 5 rises, however, a distance to position it above the rest of the shrimps in the moat formed about the raised portion of sheet 3, then only the desired number of shrimps will remain on plate 5. This selected number of shrimps will then be swept off or otherwise removed from the raised plate 5 by the rotary article transfer device. The remaining shrimps will be subjected to considerable tumbling movement during the ascent and descent of plate 5; and this will prevent the shrimps from clinging to each other or forming a cohesive mass comprised of a plurality of shrimps. Also in the case of shrimps, the openings through sheet 3 will permit smaller particles and water and other foreign substances to be separated from the shrimps; and this separation is augmented by the tumbling movement referred to above. The supply of shrimps on plate 5 is of course replenished each time the empty plate 5 descends. The transfer of articles will continue until the hopper provided by the flexible sheet is empty.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in the art will readily understand. Such modifications and variations are considered to be within the purview and scope of the present invention as defined by the appended claims.

I claim:

1. Apparatus for isolating single articles from a bulk supply, comprising a hopper comprising an open frame and having a bottom in the form of a flexible sheet secured about its entire peripheral edges to the frame and depending from the frame in the manner of a pouch, and a vertically reciprocating member for vertically reciprocating a portion of the sheet from below, said member having an upper article-supporting surface thereby to move articles resting on top of said surface above the rest of the articles in the hopper, the downward movement of said member renewing the supply of articles on top of said surface.

2. Apparatus as claimed in claim 1, said sheet being multiperforate.

3. Apparatus as claimed in claim 2, said sheet being foraminous.

4. Apparatus as claimed in claim 3, said sheet being in the form of a net.

5. Apparatus as claimed in claim 1, said member including a plate on top of said sheet with the sheet clamped between said plate and the rest of said member.

6. Apparatus as claimed in claim 5, said member being in the form of a horizontal beam.

7. Apparatus as claimed in claim 6, said plate being elongated in the direction of elongation of the beam and being upwardly concave in transverse cross section.

8. Apparatus as claimed in claim 1, and an elongated bracket which is supported at its ends for vertical reciprocatory movement and which supports said member, and means acting one the ends of the bracket to reciprocate the bracket vertically while maintaining the bracket horizontal.

9. Apparatus as claimed in claim 8, said vertical reciprocating means comprising a pair of spaced parallel horizontal bars that are perpendicular to the length of the bracket, and means for moving said bars vertically to move the bracket vertically and for moving the bars horizontally relative to the bracket to impart to the bracket a dwell period at the upper end of the path of the bracket.

10. Apparatus as claimed in claim 9, said bars being journaled in chains that circulate in vertical paths in planes perpendicular to the length of the bracket.

11. Apparatus as claimed in claim 10, the path of each chain being in the form of a polygon whose upper side is substantially horizontal.

12. Apparatus as claimed in claim 10, the chains at each end of the bracket being double and the bars being journaled between the chains.

13. Apparatus as claimed in claim 9, and rollers supporting said bracket on the bars for horizontal movement of the bars relative to the bracket.

14. Apparatus as claimed in claim 1, said member being substantially shorter than the frame in each horizontal direction thereby to raise only a central portion of said flexible sheet.

15. Apparatus as claimed in claim 1, and means fixing a central portion of the flexible sheet to said member so as to prevent movement of said fixed central portion relative to said member.

16. Apparatus as claimed in claim 1, and means for removing an article from said surface when said surface is in an elevated position and for moving said removed article in a direction away from said hopper.

17. Apparatus as claimed in claim 16, said removing means comprising a rotary transfer member and guide means extending away from said hopper and onto which said rotary transfer member moves a said article from said surface when said surface is in said elevated position.